Patented June 15, 1943

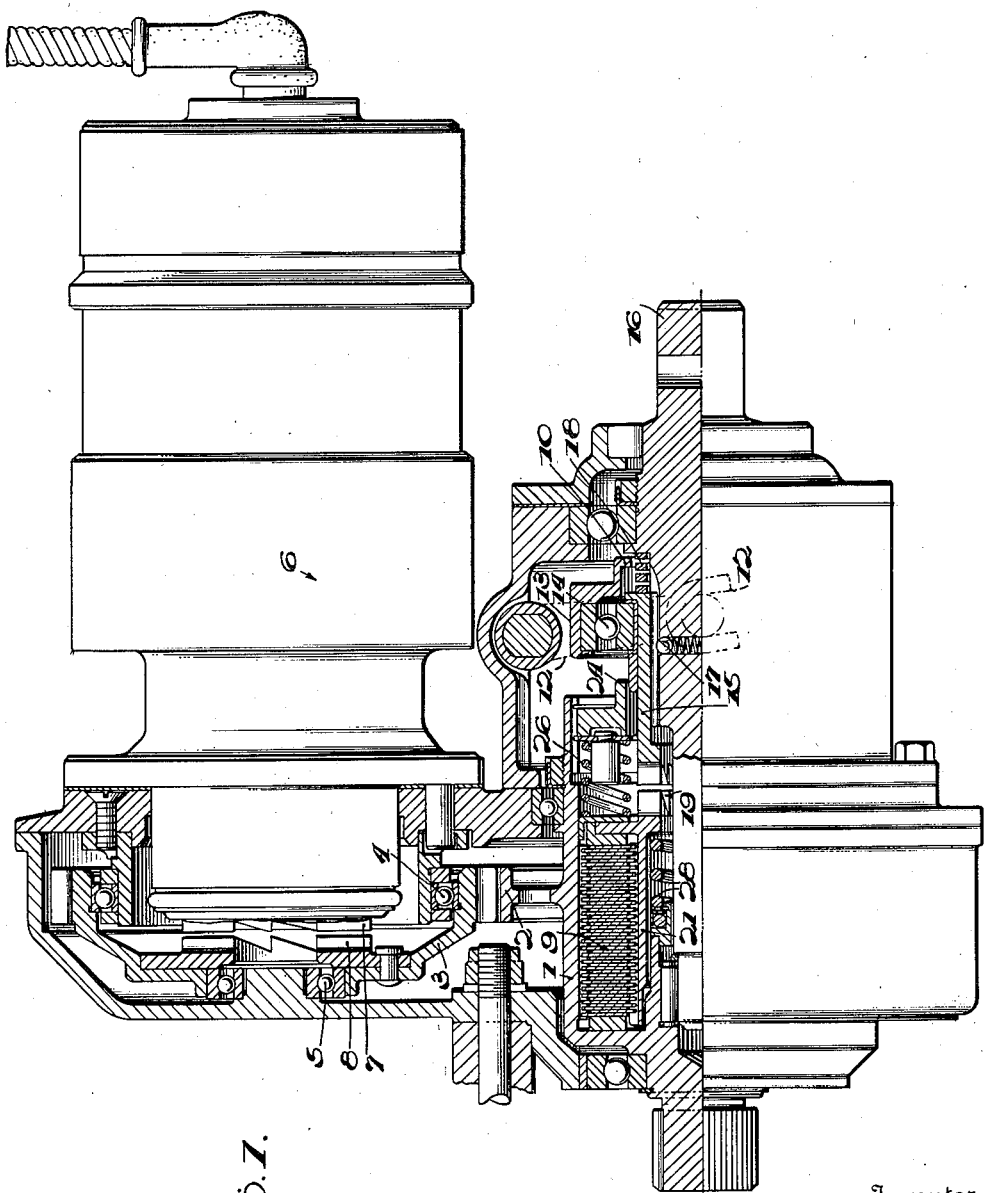

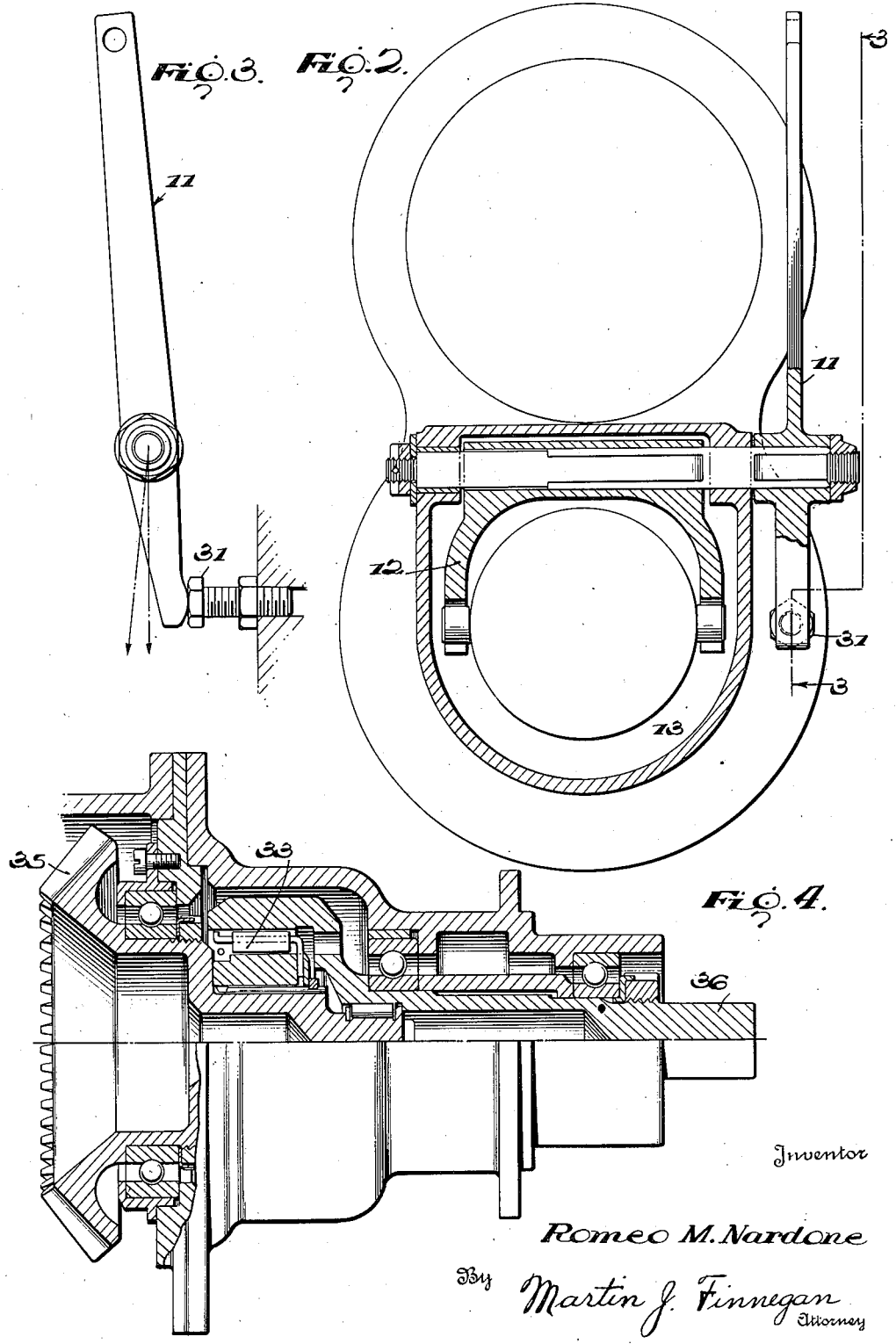

2,322,153

UNITED STATES PATENT OFFICE 2,322,153

DRIVING MECHANISM FOR AIRCRAFT PARTS

Romeo M. Nardone, Westwood, N. J., assignor to Bendix Aviation Corporation, South Bend, Ind., a corporation of Delaware Application December 12, 1940, Serial No. 369,910

1 Claim. (Cl. 192—48)

This invention relates to aircraft and particularly to aircraft of the type having freely rotative sustaining wings normally driven in flight by the action of the relative wind. In such an aircraft the rotative wing system, as explained in the specification of the Rawson Patent No. 1,921,839, usually consists of a plurality of wings or blades attached to a central hub mounted for free rotation, the whole system of wings and hub being hereinafter referred to as a rotor. An aircraft of this type will also be provided with an engine and airscrew, the rotor being rotated in normal flight by aerodynamic forces alone. Before the aircraft can take flight it is necessary to impart to the rotor a certain degree of initial rotation.

An object of the present invention is to provide novel means for drivably connecting the engine with the rotor, to impart to the rotor the necessary initial rotation.

A further object is to provide integrated engine-starting and rotor-starting means for an aircraft of the character described.

These and other objects and features of the invention are pointed out in the following description in terms of the embodiment thereof which is shown in the accompanying drawings. It is to be understood, however, that the drawings are for the purpose of illustration only, and are not designed as a definition of the limits of the invention, reference being had to the appended claim for this purpose.

In the drawings:

Fig. 1 is a view, partly in elevation and partly in longitudinal section, of a device embodying the invention;

Fig. 2 is a transverse view showing the clutch operating elements;

Fig. 3 is another view of the clutch lever; and

Fig. 4 is a view of that portion of the mechanism which is disposed in nearest relationship to the rotor to be driven.

Barrel 1, integral with gear 2, has a toothed extension adapted to be positively driven by the engine crankshaft or lay-shaft. Gear 2 drives gear 3 mounted on bearings 4 and 5. An engine-starting motor 6 has an axially movable, rotatable clutch element 7 movable into mesh with a similar clutch element 8 riveted to the gear 3; the starter 6 and clutch 7 being preferably of the automatically engaged and disengaged type disclosed in Lansing Patent No. 1,962,397, granted June 12, 1934.

A friction clutch pack 9 is normally free, or without load, but is adapted to be loaded by operation of a lever 11 secured to a yoke 12 which is in engagement with a ring 13 mounted on a ball bearing 14. Ring 13 is adapted to move freely to the left until its lip 10 contacts the rear face of a longitudinally movable ratchet ring 15. This clutch ring 15 is splined to the driven shaft 16, and is held in position by a spring-pressed ball detent 17. Pressure applied to the rear face of clutch ring 15 overcomes the hold of the detent, and spring 18 then snaps the clutch ring 15 into engagement with mating ratchet teeth 19 cut on the end of cylinder 21. Cylinder 21 has external splines to receive the drive from alternate friction disks of the clutch pack 9; the associated interleaving disks being splined to the barrel 1.

After engagement of ratchet teeth 15 and 19, further movement of ring 13 to the left causes the inner race of bearing 14 to engage the pressure plate 24 and press springs 26 against the clutch pack 9. How much these springs are compressed determines the torque value of the clutch, and the drive is transmitted from barrel 1 by way of clutch pack 9 and ratchet teeth 15, 19 to driven shaft 16.

When lever 11 is brought back to its original position, jaw 15 is drawn back and held by detent 17, and spring 28 re-expands to release the pressure on the clutch pack 9. A stop 31 limits the movement of lever 11 and thereby limits the torque value that can be transmitted by the clutch pack.

The drive from shaft 16 to the aircraft rotor includes a free-wheeling roller clutch 33 (Fig. 4) having an inner race keyed or splined to the hub of a bevel gear 35 driven by a mating gear (not shown) driven through a universal joint drive extending from the end of shaft 16; the outer race of the roller clutch 33 being integral with a shaft 36 whose projecting end receives the rotor blades (not shown) corresponding to the rotor blades 21 of the above-identified Rawson patent.

By reason of this uni-directional clutch 33 a free-wheeling action of the rotor blades is made possible even in advance of manual disengagement of the ratchet rings 15, 19. Hence an inadvertent omission, on the part of the operator, to return the lever to the ratchet-disengaging position will not interfere with free rotation of the rotor blades, after the initial drive from the engine has served its purpose.

What is claimed is:

In a driving mechanism, a driving member, a driven member, an intermediate assembly including a pair of overrunning clutch elements, a second pair of overrunning clutch elements interposed between the first pair and the driven member, means normally separating said first pair of clutch elements, means for engaging said first pair of clutch elements against the resistance of said separating means, one of said first pair of clutch elements having a splined surface, and means including a friction disc clutch interposed between said splined surface and said driving member.

ROMEO M. NARDONE.